(12) United States Patent
Widlroither

(10) Patent No.: US 11,787,017 B2
(45) Date of Patent: Oct. 17, 2023

(54) IMPACT WRENCH FOR TIGHTENING AND LOOSENING NUTS AND SCREWS ON A TRACK

(71) Applicant: ROBEL Bahnbaumaschinen GmbH, Freilassing (DE)

(72) Inventor: Otto Widlroither, Freilassing (DE)

(73) Assignee: ROBEL Bahnbaumaschinen GmbH, Freilassing (DE)

( * ) Notice: Subject to any disclaimer, the term of this patent is extended or adjusted under 35 U.S.C. 154(b) by 117 days.

(21) Appl. No.: 17/056,989

(22) PCT Filed: May 29, 2018

(86) PCT No.: PCT/EP2018/064024
§ 371 (c)(1),
(2) Date: Nov. 19, 2020

(87) PCT Pub. No.: WO2019/228609
PCT Pub. Date: Dec. 5, 2019

(65) Prior Publication Data
US 2021/0370484 A1    Dec. 2, 2021

(51) Int. Cl.
| B25F 5/00 | (2006.01) |
| B25F 5/02 | (2006.01) |
| B25B 21/02 | (2006.01) |
| E01B 29/28 | (2006.01) |

(52) U.S. Cl.
CPC ............ B25B 21/026 (2013.01); B25F 5/006 (2013.01); E01B 29/28 (2013.01)

(58) Field of Classification Search
CPC ........... B25F 5/02; B25F 5/006; B25B 21/026
See application file for complete search history.

(56) References Cited

U.S. PATENT DOCUMENTS

| 3,637,029 A | * | 1/1972 | Sherwood, Jr. | ......... B27B 17/00 30/373 |
| 3,759,334 A | | 9/1973 | Theurer | |
| 3,824,417 A | * | 7/1974 | Moores, Jr. | ............ H02K 7/145 173/117 |
| 3,968,843 A | * | 7/1976 | Shotwell | .............. B25D 17/043 173/210 |
| 4,609,053 A | * | 9/1986 | Ragnmark | ............. B25D 17/24 173/104 |
| 4,711,308 A | * | 12/1987 | Blaas | ................... B25D 17/043 16/431 |
| 7,971,655 B2 | * | 7/2011 | Steinke | ................ B25D 17/043 173/90 |
| 8,061,438 B2 | * | 11/2011 | Schmid | ................ B25D 17/043 173/90 |
| 8,087,472 B2 | * | 1/2012 | Usselman | .............. B25D 17/24 173/217 |

(Continued)

FOREIGN PATENT DOCUMENTS

| CH | 546128 A | 2/1974 |
| CN | 105102190 A | 11/2015 |

(Continued)

*Primary Examiner* — Gloria R Weeks
(74) *Attorney, Agent, or Firm* — McGlew and Tuttle, P.C.

(57) ABSTRACT

An impact wrench for tightening and loosening nuts and screws on a track has a vibration decoupling device which serves for vibration decoupling of at least one handle from an electrically operated impact screwing mechanism.

20 Claims, 2 Drawing Sheets

(56) References Cited

U.S. PATENT DOCUMENTS

| | | | | |
|---|---|---|---|---|
| 8,162,075 | B2* | 4/2012 | Roberts | B25D 17/043 173/162.1 |
| 8,327,949 | B2* | 12/2012 | Meixner | B25F 5/02 16/431 |
| 8,430,182 | B2* | 4/2013 | Soika | B25F 5/006 173/210 |
| 8,621,719 | B2* | 1/2014 | Nakashima | B25F 5/006 16/422 |
| 8,657,029 | B2* | 2/2014 | Miyazawa | B25F 5/02 173/48 |
| 8,674,640 | B2* | 3/2014 | Suda | B25D 16/006 173/4 |
| 9,073,563 | B2* | 7/2015 | Middleton | B62B 7/00 |
| 9,308,636 | B2* | 4/2016 | Wyler | B25D 17/24 |
| 9,590,475 | B2* | 3/2017 | Oomori | B25F 5/008 |
| 9,849,577 | B2* | 12/2017 | Wyler | B25D 11/125 |
| 2003/0094294 | A1* | 5/2003 | Fritz | B25H 3/006 173/171 |
| 2005/0058890 | A1* | 3/2005 | Brazell | H01M 50/24 429/97 |
| 2008/0048507 | A1* | 2/2008 | Kanda | H02K 11/028 310/420 |
| 2008/0196555 | A1 | 8/2008 | Yoon | |
| 2008/0277129 | A1 | 11/2008 | Barezzani et al. | |
| 2009/0266571 | A1* | 10/2009 | Baumann | B25F 5/026 173/162.2 |
| 2009/0308624 | A1* | 12/2009 | Shibata | B25B 23/1405 173/176 |
| 2010/0186979 | A1* | 7/2010 | Krauter | B25F 5/006 29/527.1 |
| 2010/0186980 | A1* | 7/2010 | Heilig | B24B 23/04 173/217 |
| 2013/0161041 | A1* | 6/2013 | Junkers | B25F 5/001 173/176 |
| 2013/0175067 | A1* | 7/2013 | Parel | B25F 5/02 428/141 |
| 2014/0182428 | A1* | 7/2014 | Moreno | B23D 51/02 83/13 |
| 2014/0251649 | A1* | 9/2014 | Kondo | B23Q 9/00 16/426 |
| 2015/0328764 | A1* | 11/2015 | Yoshikane | B25D 16/00 173/104 |
| 2016/0346911 | A1 | 12/2016 | Blum et al. | |
| 2017/0225316 | A1* | 8/2017 | Iwakami | B25F 5/02 |
| 2018/0099393 | A1 | 4/2018 | Iida et al. | |
| 2018/0099399 | A1* | 4/2018 | Sunabe | B25F 5/02 |
| 2018/0117728 | A1* | 5/2018 | Kawakami | B25F 5/026 |
| 2018/0126534 | A1 | 5/2018 | Iida et al. | |
| 2019/0111532 | A1* | 4/2019 | Garcia | B23Q 11/0046 |

FOREIGN PATENT DOCUMENTS

| | | |
|---|---|---|
| CN | 108015720 A | 5/2018 |
| DE | 102004032789 A1 | 2/2006 |
| DE | 202016006565 U1 | 1/2017 |
| EP | 0104154 A2 | 3/1984 |
| EP | 0928669 A2 | 7/1999 |
| EP | 2138278 B1 | 9/2011 |
| JP | S54-89699 U | 6/1979 |
| JP | 2012139763 A | 7/2012 |
| RU | 2503813 C2 | 1/2014 |
| SU | 700071 A3 | 11/1979 |
| WO | 2014032643 A1 | 3/2014 |
| WO | 2017129213 A1 | 8/2017 |

* cited by examiner

IMPACT WRENCH FOR TIGHTENING AND LOOSENING NUTS AND SCREWS ON A TRACK

FIELD OF THE INVENTION

The invention relates to an impact wrench for tightening and loosening nuts and screws on a track having an impact screwing mechanism, an electric drive motor for driving the impact screwing mechanism, a rechargeable battery for supplying the electric drive motor with electrical energy, and at least one handle for holding the impact wrench.

BACKGROUND OF THE INVENTION

An electrically operated impact wrench that can be used to tighten and loosen nuts and screws on a track is known. An impact wrench of this kind is used, for example, to tighten and loosen nuts and screws which connect rails to associated sleepers. Working with an impact wrench of this kind is very strenuous for an operator since high torques and forces act during the operation of the impact wrench.

SUMMARY OF THE INVENTION

It is an underlying object of the invention to provide an impact wrench which is of simple construction, is reliable and allows a high degree of operating comfort.

This object is achieved by an impact wrench comprising a vibration decoupling device for vibration decoupling of the at least one handle and of the impact screwing mechanism. By means of the vibration decoupling device, the at least one handle is decoupled from the impact screwing mechanism in a manner that damps vibration. The vibration decoupling device is preferably designed in such a way that hand-arm vibrations of an operator do not exceed a limit value of 5 m/s$^2$. The at least one handle is used to hold the impact wrench with both hands. The vibration decoupling device defines a decoupling plane which separates a working side from an operator side. The impact screwing mechanism is arranged on the working side, whereas the at least one handle is arranged on the operator side, thus ensuring that forces and vibrations caused by the impact screwing mechanism act on the at least one handle only in a highly damped manner by virtue of the vibration decoupling device.

The term "decoupling plane" should be understood functionally in such a way that the working side is decoupled vibrationally from the operator side by the vibration decoupling device. The term "decoupling plane" should in no way be interpreted as a plane in a strictly geometrical sense.

An impact wrench, in which the vibration decoupling device has at least one vibration damper for the formation of a decoupling plane between the impact screwing mechanism and the at least one handle, ensures a high degree of operating comfort. The at least one vibration damper is of flexible design, thus ensuring that vibration decoupling or vibration damping is achieved. The at least one vibration damper preferably comprises an elastomeric material, in particular a rubber material. In particular, the vibration decoupling device has at least two, in particular at least three and, in particular, at least four vibration dampers. The vibration dampers are preferably arranged around an axis of rotation of the electric drive motor. The at least one vibration damper forms the decoupling plane between the impact screwing mechanism and the at least one handle.

An impact wrench, in which the impact screwing mechanism and the electric drive motor are arranged on a working side of a decoupling plane formed by the vibration decoupling device, ensures a high degree of operating comfort in a simple manner By virtue of the fact that the electric drive motor is arranged on the working side of the decoupling plane together with the impact screwing mechanism, the forces and vibrations caused by the electric drive motor are also decoupled or damped by means of the vibration decoupling device, and therefore they likewise act on the at least one handle only in a highly damped manner By virtue of the fact that the electric drive motor is arranged on the working side, the mechanical connection to the impact screwing mechanism is of simple and reliable design. In particular, it is not necessary to guide a mechanical drive shaft through the decoupling plane and likewise to decouple or damp vibrations transmitted via the mechanical drive shaft.

An impact wrench, in which the at least one handle and the rechargeable battery are arranged on an operator side of a decoupling plane formed by the vibration decoupling device, ensures a high degree of operating comfort in a simple manner By virtue of the fact that the rechargeable battery is arranged on the operator side, it forms a counterweight to the impact screwing mechanism and, where applicable, to the electric drive motor, with the result that the rechargeable battery brings about effective vibration damping or vibration decoupling at the at least one handle. The rechargeable battery is preferably secured on a support frame, on which, in turn, at least one handle and the vibration decoupling device are secured.

An impact wrench, in which the rechargeable battery is secured interchangeably on a support frame and is connected to a handle, ensures a high degree of operating comfort in a simple manner By virtue of the fact that the rechargeable battery is secured interchangeably on the support frame, a discharged rechargeable battery can be replaced quickly and easily with a charged rechargeable battery during the operation of the impact wrench, and operation of the impact wrench can be continued. The handle connected to the rechargeable battery is used, on the one hand, for changing the rechargeable battery and, on the other hand, for holding the impact wrench during operation. By virtue of the fact that the rechargeable battery and the handle secured thereon are arranged on the operator side, the handle secured on the rechargeable battery is likewise vibrationally decoupled or vibrationally damped.

An impact wrench, in which a control device is arranged on an operator side of a decoupling plane formed by the vibration decoupling device, ensures a high degree of reliability and a high degree of operating comfort. By virtue of the fact that the control device is arranged on the operator side, it is protected from undamped forces or vibrations of the impact screwing mechanism and, as a result, the reliability of the impact wrench is high. In particular, the control device comprises at least one operating element for controlling the electric drive motor, said element being secured close to the at least one handle or on the at least one handle in a simple manner on the vibration-decoupled or vibration-damped operator side.

An impact wrench, in which only lines run through a decoupling plane formed by the vibration decoupling device, ensures a high degree of operating comfort in a simple manner By virtue of the fact that only lines run through the decoupling plane, that is to say that there is no mechanical connection for driving the impact screwing mechanism running through the decoupling plane, optimum vibration decoupling or vibration damping is made possible. Lines are electric lines for controlling and supplying power to the electric drive motor and possibly at least one coolant line. By virtue of the fact that the rechargeable battery is arranged on the operator side and the electric drive motor, together with the impact screwing mechanism, is arranged on the working side, it is sufficient that only electric lines for controlling and supplying power to the electric drive motor and possibly at least one coolant line run through the decoupling plane. The lines transmit substantially no forces or vibrations from the working side to the operator side.

Further features, advantages and details of the invention will become apparent from the following description of an exemplary embodiment.

DESCRIPTION OF THE PREFERRED EMBODIMENT

Figure 1:
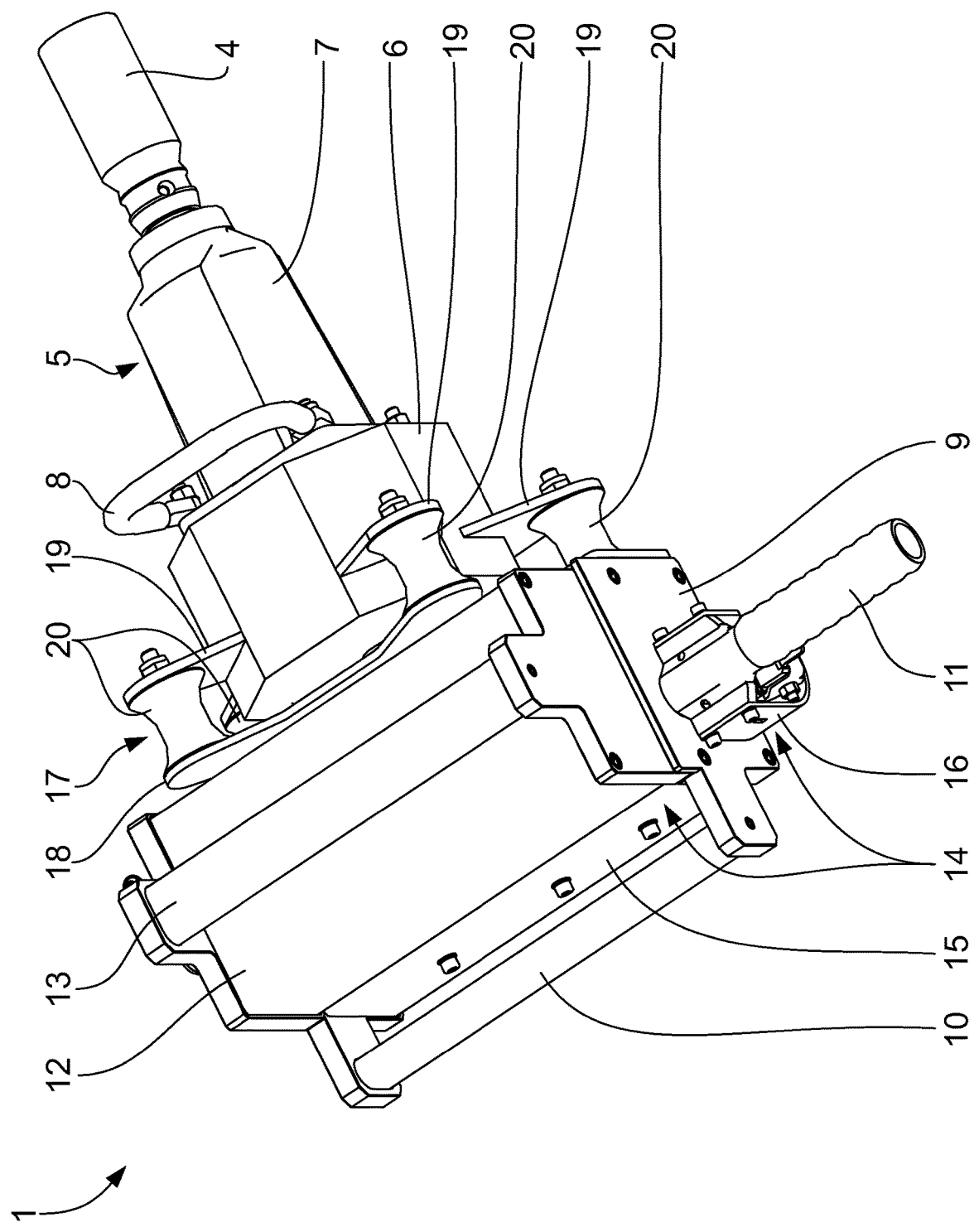
FIG. 1 shows a perspective view of an impact wrench.

An electrically operated impact wrench 1 has an electric drive motor 2, which is connected in a torque-transmitting manner to an impact screwing mechanism 3. A screwing head 4 is secured on the impact screwing mechanism 3. The electric drive motor 2 and the impact screwing mechanism 3 are known and conventional.

The electric drive motor 2 and the impact screwing mechanism 3 are arranged in a housing 5, which is of two-part design. The electric drive motor 2 is arranged in a first housing part 6, whereas the impact screwing mechanism 3 is arranged in a second housing part 7. A carrying handle 8 is secured on the housing 5.

The impact wrench 1 furthermore comprises a support frame 9, on which a first handle 10 is arranged substantially centrally and a second handle 11 is arranged laterally. A rechargeable battery 12 is secured interchangeably on the support frame 9. The rechargeable battery 12 is connected to a third handle 13. The rechargeable battery 12 supplies the electric drive motor 2 and the control device 14 with electric energy. The control device 14 comprises a controller 15, which is secured on the support frame 9, and an operating unit 16, which is secured on the second handle 11. The operating unit 16 has at least one operating element for controlling the electric drive motor 2, for example.

For vibration decoupling of the handles 10, 11, 13 from the impact screwing mechanism 3 and the electric drive motor 2, the impact wrench 1 has a vibration decoupling device 17. The vibration decoupling device 17 comprises a fixing element 18 on the operator side, which is secured on the support frame 9, and fixing elements 19 on the working side, which are secured on the first housing part 6. The vibration decoupling device 17 furthermore comprises a plurality of vibration dampers 20, which connect the fixing element 18 on the operator side to the fixing elements 19 on the working side in a vibration-damping manner. The vibration dampers 20 are produced from an elastomeric material, e.g. from a rubber material. By way of example, the impact wrench 1 has four vibration dampers 20, which are arranged around an axis of rotation D of the electric drive motor 2.

The vibration decoupling device 17 or vibration dampers 20 form a decoupling plane E, which decouples a working side 21 from an operator side 22. The electric drive motor 2, the impact screwing mechanism 3 and the screwing head 4 are arranged on the working side 21. Arranged opposite these, on the operator side 22, are the support frame 9 with the handles 10, 11, the rechargeable battery 12 with the handle 13, and the control device 14.

Figure 2:
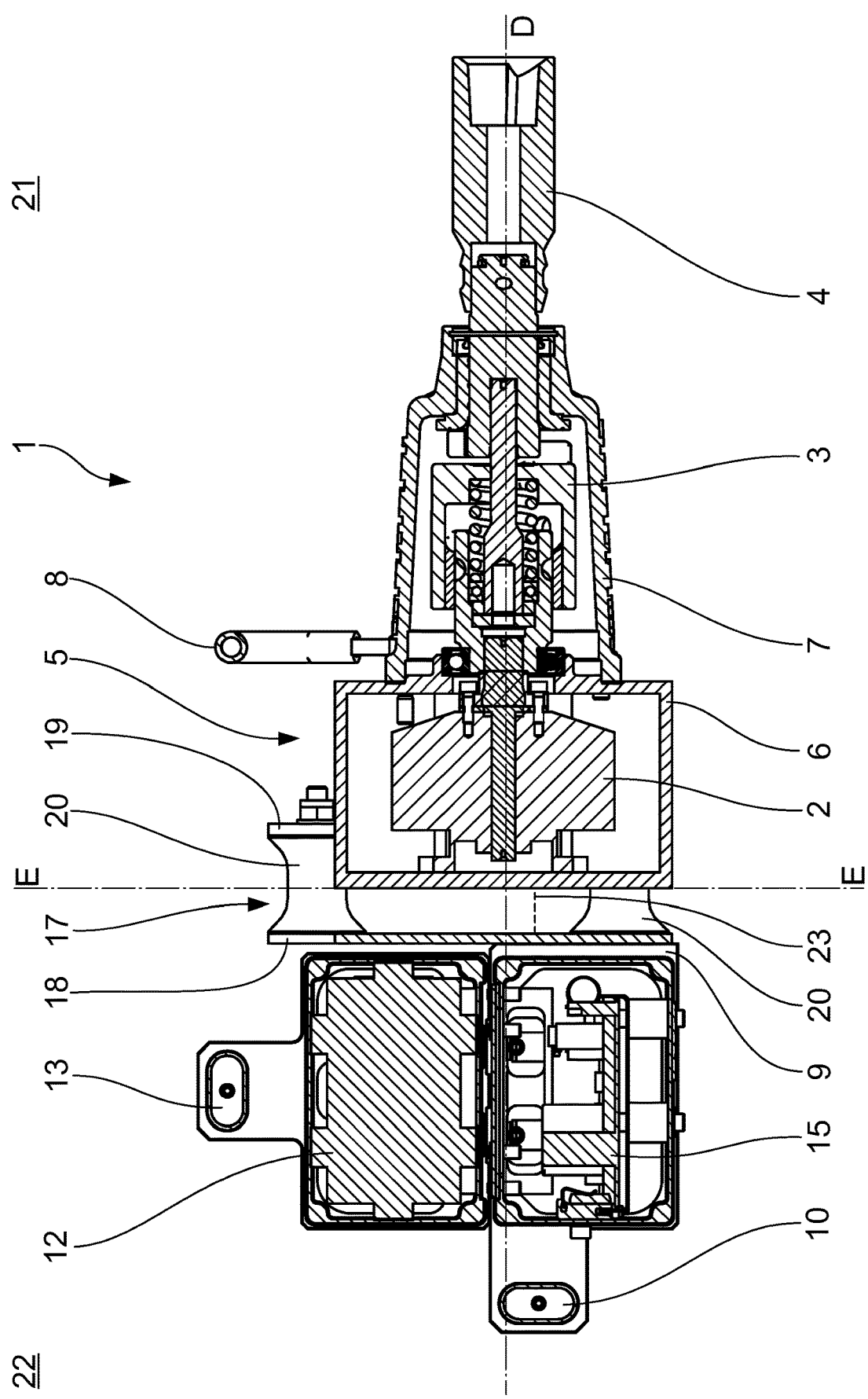
FIG. 2 shows a section through the impact wrench in FIG. 1.

Only electric lines 23 for controlling and supplying power to the electric drive motor 2 run through the decoupling plane E from the operator side 22 to the working side 21. In FIG. 2, the electric lines 23 are illustrated only schematically.

The impact wrench 1 is used to tighten and loosen nuts and screws on a track. The nuts and screws are required to connect rails to associated sleepers. High torques and forces are required to tighten and loosen these nuts and screws.

The electric drive motor 2 is controlled by means of the control device 14, enabling an operator to actuate the nuts and screws in a desired manner during the operation of the impact wrench 1. During this process, the operator holds the impact wrench 1 with both hands, e.g. by the handles 10 and 11 or 13 and 11. By means of the vibration decoupling device 17, the forces or vibrations caused by the electric drive motor 2 and the impact screwing mechanism 3 are damped in an effective manner, and therefore the working side 21 is decoupled vibrationally from the operator side 22. In this arrangement, the rechargeable battery 12 acts as a counterweight on the operator side 22 and ensures effective vibration damping.

Once the rechargeable battery 12 is discharged, it can be exchanged in a simple manner by means of the handle 13 and swapped with a charged rechargeable battery 12. By virtue of the fact that the control device 14 is arranged on the operator side 22, it is protected from vibration.

The invention claimed is:

1. An impact wrench for tightening and loosening nuts and screws on a track for connecting rails to associated sleepers, the impact wrench comprising:
   an impact screwing mechanism comprising an impact screwing mechanism axis of rotation;
   an electric drive motor for driving the impact screwing mechanism, the electric drive motor comprising an electric drive motor axis of rotation, the electric drive motor axis of rotation being identical to the impact screwing mechanism axis of rotation;
   a rechargeable battery for supplying the electric drive motor with electrical energy;
   at least one handle for holding the impact wrench, the impact wrench comprising a vibration decoupling device for vibration decoupling of the at least one handle and of the impact screwing mechanism;
   a housing; and
   a support frame, wherein the electric drive motor and the impact screwing mechanism are arranged in the housing and the at least one handle and the rechargeable battery are arranged on the support frame, wherein the housing and the support frame are exclusively connected to each other via fixing elements and a plurality of vibration dampers.

2. An impact wrench according to claim 1, wherein the vibration decoupling device has at least one vibration damper for the formation of a decoupling plane between the impact screwing mechanism and the at least one handle.

3. An impact wrench according to claim 1, wherein the impact screwing mechanism and the electric drive motor are arranged on a working side of a decoupling plane formed by the vibration decoupling device.

4. An impact wrench according to claim 1, wherein the at least one handle and the rechargeable battery are arranged on an operator side of a decoupling plane formed by the vibration decoupling device.

5. An impact wrench according to claim 4, wherein the rechargeable battery is secured interchangeably on the support frame and is connected to a handle.

6. An impact wrench according to claim 1, wherein a control device is arranged on an operator side of a decoupling plane formed by the vibration decoupling device.

7. An impact wrench according to claim 1, wherein only lines run through a decoupling plane formed by the vibration decoupling device.

8. An impact wrench according to claim 1, wherein the vibration decoupling device comprises a first vibration damper, a second vibration damper and a third vibration damper for the formation of a decoupling plane between the impact screwing mechanism and the at least one handle.

9. An impact wrench according to claim 8, wherein the first vibration damper, the second vibration damper and the third vibration damper are arranged about the electric drive motor axis of rotation.

10. An impact wrench according to claim 9, wherein the housing comprises a housing interior space, the vibration decoupling device comprising an operator side fixing element located on an operator side of the decoupling plane, the operator side fixing element being located between the rechargeable battery and the electric drive motor, the vibration decoupling device comprising a first working side fixing element, a second working side fixing element and a third working side fixing element, each of the first working side fixing element, the second working side fixing element and the third working side fixing element being arranged on a working side of the decoupling plane, the first working side fixing element, the second working side fixing element and the third working side fixing element being arranged about the electric drive motor axis of rotation, each of the first working side fixing element, the second working side fixing element and the third working side fixing element extending from the housing in a radial direction with respect to the electric drive motor axis of rotation, the first vibration damper being in contact with a first area of the operator side fixing element and the first working side fixing element, the second vibration damper being in contact with a second area of the operator side fixing element and the second working side fixing element, the third vibration damper being in contact with a third area of the operator side fixing element and the third working side fixing element.

11. An impact wrench, comprising:
an impact screwing mechanism comprising an impact screwing mechanism axis of rotation;
an electric drive motor comprising an electric drive motor axis of rotation, the electric drive motor axis of rotation being identical to the impact screwing mechanism axis of rotation, the impact screwing mechanism being configured to be actuated via the electric drive motor such that a screwing head connected to the impact screwing mechanism is rotated for tightening and loosening nuts and screws on a track for connecting rails to associated sleepers;
a rechargeable battery for supplying the electric drive motor with electrical energy;
at least one handle for holding the impact wrench;
a vibration decoupling device for vibration decoupling of the at least one handle and of the impact screwing mechanism;
a housing; and
a support frame, wherein the electric drive motor and the impact screwing mechanism are arranged in the housing and the at least one handle and the rechargeable battery are arranged on the support frame, wherein the housing and the support frame are exclusively connected to each other via fixing elements and a plurality of vibration dampers.

12. An impact wrench according to claim 11, wherein the vibration decoupling device has at least one vibration damper for the formation of a decoupling plane between the impact screwing mechanism and the at least one handle.

13. An impact wrench according to claim 11, wherein the impact screwing mechanism and the electric drive motor are arranged on a working side of a decoupling plane formed by the vibration decoupling device.

14. An impact wrench according to claim 11, wherein the at least one handle and the rechargeable battery are arranged on an operator side of a decoupling plane formed by the vibration decoupling device.

15. An impact wrench according to claim 14, wherein the rechargeable battery is secured interchangeably on the support frame and is connected to a handle.

16. An impact wrench according to claim 11, wherein a control device is arranged on an operator side of a decoupling plane formed by the vibration decoupling device.

17. An impact wrench according to claim 11, wherein only lines run through a decoupling plane formed by the vibration decoupling device.

18. An impact wrench according to claim 11, wherein the vibration decoupling device comprises a first vibration damper, a second vibration damper and a third vibration damper for the formation of a decoupling plane between the impact screwing mechanism and the at least one handle.

19. An impact wrench according to claim 18, wherein the first vibration damper, the second vibration damper and the third vibration damper are arranged about the electric drive motor axis of rotation.

20. An impact wrench according to claim 19, wherein the housing comprises a housing interior space, the vibration decoupling device comprising an operator side fixing element located on an operator side of the decoupling plane, the operator side fixing element being located between the rechargeable battery and the electric drive motor, the vibration decoupling device comprising a first working side fixing element, a second working side fixing element and a third working side fixing element, each of the first working side fixing element, the second working side fixing element and the third working side fixing element being arranged on a working side of the decoupling plane, the first working side fixing element, the second working side fixing element and the third working side fixing element being arranged about the the electric drive motor axis of rotation, each of the first working side fixing element, the second working side fixing element and the third working side fixing element extending from the housing in a radial direction with respect to the the electric drive motor axis of rotation, the first vibration damper being in contact with a first area of the operator side fixing element and the first working side fixing element, the second vibration damper being in contact with a second area of the operator side fixing element and the second working side fixing element, the third vibration damper being in contact with a third area of the operator side fixing element and the third working side fixing element.

* * * * *